C. E. BURCHFIELD.
AUTOMATIC PIPE COUPLING.
APPLICATION FILED APR. 15, 1911.
1,009,645.
Patented Nov. 21, 1911.
3 SHEETS—SHEET 1.
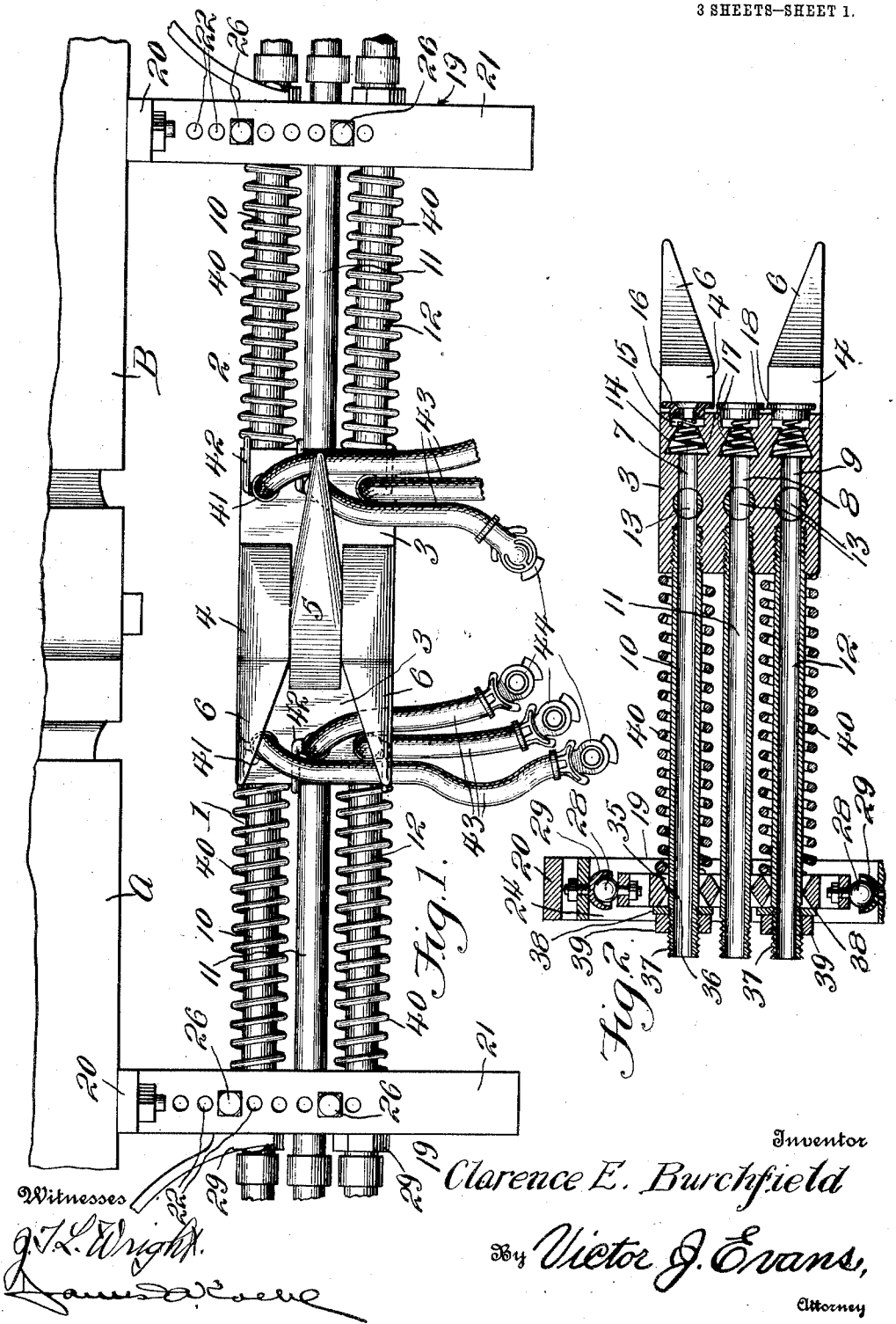
Witnesses
G. L. Wright
Inventor
Clarence E. Burchfield
By Victor J. Evans,
Attorney

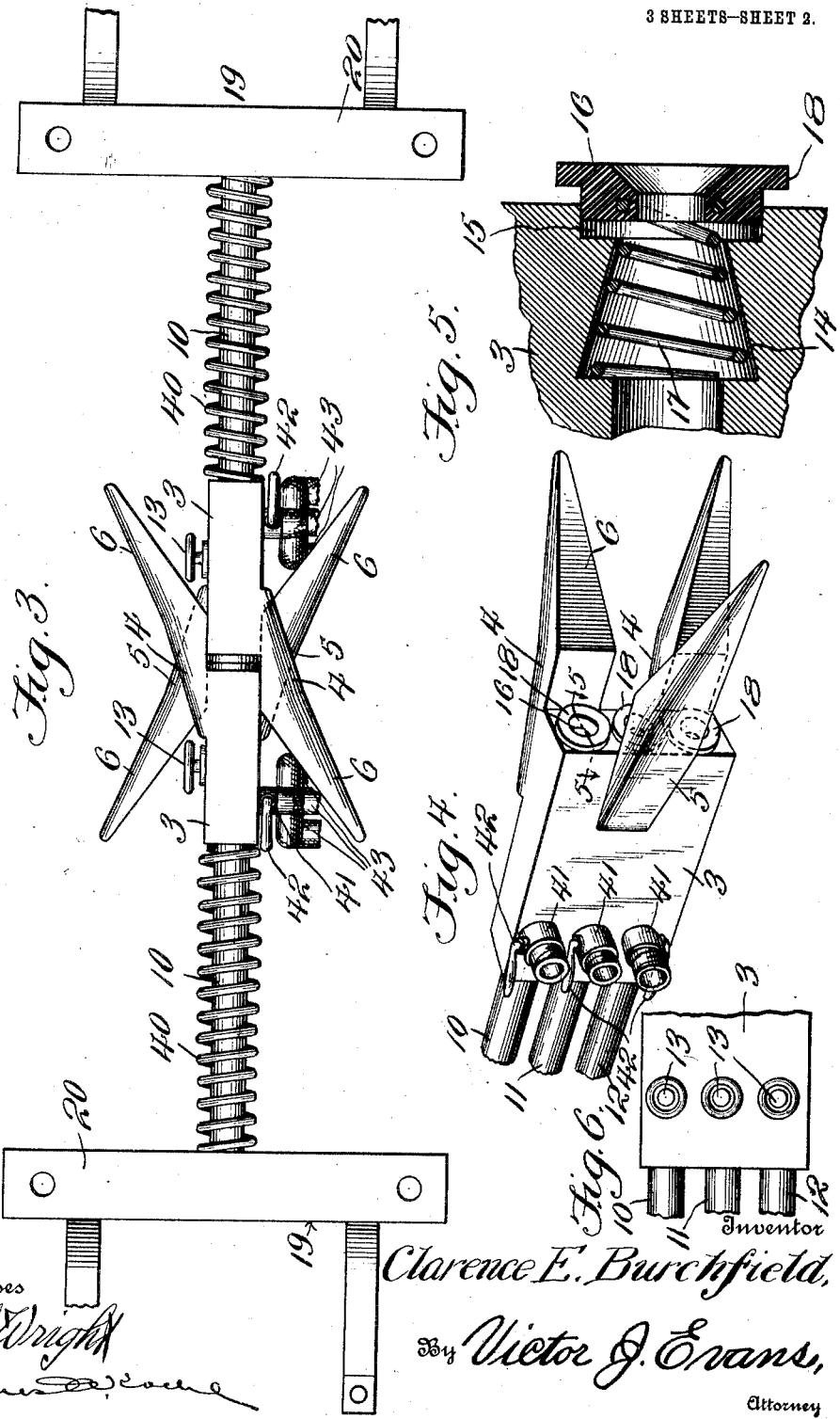

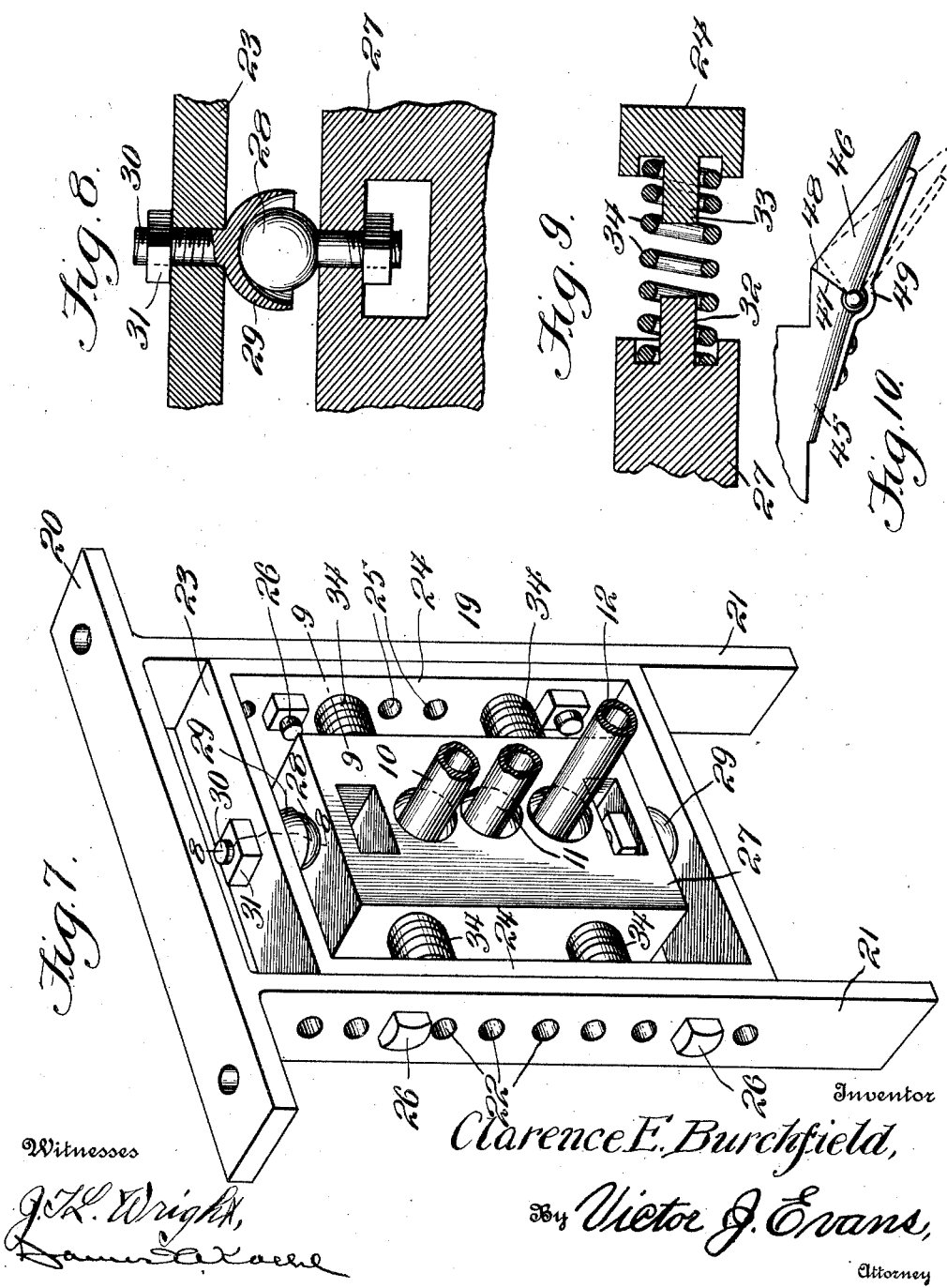

UNITED STATES PATENT OFFICE.

CLARENCE E. BURCHFIELD, OF JOHNSON CITY, TENNESSEE.

AUTOMATIC PIPE-COUPLING.

1,009,645.     Specification of Letters Patent.     Patented Nov. 21, 1911.

Application filed April 15, 1911. Serial No. 621,289.

*To all whom it may concern:*

Be it known that I, CLARENCE E. BURCHFIELD, a citizen of the United States, residing at Johnson City, in the county of Washington and State of Tennessee, have invented new and useful Improvements in Automatic Pipe-Couplings, of which the following is a specification.

This invention relates to automatic pipe couplings for uniting the steam, air and signal pipes, and has for an object to provide adjustably supporting means for connecting the coupling heads of the adjacent cars relatively so that the mating members of the coupling may be brought into effective coupling engagement on coupling of the cars, and further, the provision of elastic means for yieldingly forcing the respective coupling heads of the adjacent cars so as to form perfect air and steam tight joints between the heads when the cars are coupled.

Another object of the invention is to provide means in the coupling head supports of the cars for permitting the heads to move relatively when coupling the heads with each other.

In the drawings, forming a portion of this specification and in which like numerals of reference indicate similar parts in the several views:—Figure 1 is a side view of the mating head members of my improved coupling showing their application to adjacent cars. Fig. 2 is a vertical section through one of the coupling members. Fig. 3 is a top plan view of the coupling. Fig. 4 is a fragmentary perspective view of one of the coupling members. Fig. 5 is a section taken substantially on line 5—5 of Fig. 4. Fig. 6 is a side view of a portion of one of the heads. Fig. 7 is a perspective view of one of the supports. Fig. 8 is a section on line 8—8 of Fig. 7. Fig. 9 is a section on line 9—9 of Fig. 7. Fig. 10 is a plan view of a portion of one of the heads showing a slightly modified form of my invention.

My improved coupling comprises mating members 1 and 2, each of which includes a head 3 which is provided at its forward end at one side with superimposed jaws 4 and at the other side with a single jaw 5, the jaw 5 of one of the heads being designed to fit between the jaws 4 of the adjacent head when the coupling is in its coupled position. The jaws 4 and 5 are provided with outwardly flared guiding surfaces 6 which are designed to guide the members into effective coupling contact with each other as will be understood. As the mating members of the coupling are identical in construction with the exception of the features hereinabove described, it is thought that a description of one member of the coupling will suffice for both.

The member 1 has its head portion 3 provided with conduits 7, 8 and 9 in which are fitted the outer ends of the steam, air and air signal pipes 10, 11 and 12 respectively, each of said conduits has mounted therein a suitable valve 13 which may be operated to cut off the supply of fluid. At the forward end, each conduit opens into a substantially conical passage 14, the reduced end of said passage being arranged in direct or open communication with a gasket passage 15 in which is slidably fitted a gasket 16. A substantially conical or convolute extensile spring 17 is fitted in the passage 14 of the head, the small end of this spring being embedded in the gasket 16, as clearly shown in Fig. 5 of the drawings. Under tension of the spring 17 the gasket is normally held in an extended position. In other words, the seating surface 18 of the gasket is spaced from the forward end of the head 3 as shown in Figs. 2 and 5 of the drawings. The spring 17, besides operating to hold the gasket normally extended, as above described, also operates to hold the gasket operatively connected with the head.

The members 1 and 2 are mounted beneath the adjacent cars A and B which are shown in Fig. 1 of the drawings, each car having mounted therebeneath a support 19 which includes a horizontal bracket or attaching portion 20 and depending spaced parallel members 21. Each member 21 is provided with a vertical series of suitably spaced adjusting passages 22, the passages in one member being arranged in coincidence with the passages of the opposite member. A frame 23, preferably of rectangular configuration, is mounted between the parallel members 21, the side members 24 of the frame having formed therein passages 25 which are adapted to aline with the passages 22 in the members 21 of the support. Clamping bolts 26 are interchangeably fitted in the passages 22 and 25 and are adapted to hold the support 19 and the frame 23 fixed relatively.

A head 27 is mounted in the frame 23, and as shown, said head is provided with upper and lower spherical bearings 28 which are mounted in socket members 29 on the upper and lower ends respectively of the frame 23, each socket member being preferably provided with a threaded shank 30 which extends through the frame and which is secured thereto by the clamping nut 31. The socket members 29 have the walls of their sockets flared downwardly and outwardly from a point in an axial line with the shanks 30 so that the outer peripheral surfaces of the spherical bearings 28 are in normal contact with the walls of the sockets in direct axial alinement with the shanks. By constructing the socket member 29 with the walls of its socket flared downwardly and outwardly in spaced relation to the spherical bearing member, means are provided whereby the head 27 may be moved at an angle to the axial line of the socket members. Studs 32 extend outwardly from the sides of the head 27, being arranged in line with similar studs 33 which extend inwardly from the side members 21 of the support 19. Relatively strong extensile springs 34 are interposed between the sides of the head 27 and the sides of the frame 23, the ends of the springs being fitted to the studs 32 and 33 respectively, as shown in Fig. 9 of the drawings. These springs serve to maintain the head 27 in operative coupling position but permits the head to move horizontally with the hereinbefore described members 28 and 29 respectively, as a pivot.

The steam, air and air signal pipes have their inner ends extended through passages 35 in the head 27, the walls of each passage being flared in opposite directions from its center so as to provide central relatively sharp circular peripheral fulcrum surfaces 36. The inner ends of the pipes 10 and 12 are threaded, at 37, and fitted thereon are washers and nuts 38 and 39 respectively. Relatively strong extensile springs 40 encircle the pipes 10 and 12, the ends of the springs being confined between the heads 3 and 27 respectively so that under tension of the springs the head 3 will be normally held in an extended position for effective contact on coupling engagement with the adjacent head 3 on coupling of the cars.

Nipples 41 are arranged in the side of the head 3, and as illustrated, these nipples are arranged in communication with the conduits 7, 8 and 9 respectively. Each nipple is provided with a controlling valve 42 and a flexible hose 43, one end of the latter having attached thereto any suitable well known form of coupling head 44.

Should it be desired to couple a car having my improved form of coupling head applied thereto with a car which is simply provided with the usual form of steam, air and air signal couplings, the said usual couplings can be readily connected with the coupling heads 44. In this case, the valves 13 are cut off, and the valves 42 are opened.

In couplings of the character described, it has been found from experience that it is almost utterly impossible to obtain an effective seating of the elastic gaskets of the respective members of the coupling by simply employing springs which operate to hold the heads normally in extended positions. These springs in time lose considerable elasticity, and in view thereof, I compensate for such loss by the use of the springs 17. These springs operate to form a most effective contact or seating of the gaskets when the coupling members are connected with each other.

In the modified form of my invention shown in Fig. 10, the jaw 45 is provided with a hinged guiding surface 46, the jaw having a shoulder 47 thereon which is engaged by a similar shoulder 48 on the guiding surface, and the said shoulders being normally held in contact by the springs 49, as shown.

I claim:

1. A fluid coupling comprising a member having fluid conduits, elastic gaskets yieldingly mounted in the conduits, a vertically adjustable frame, a head supporting the coupling member and movably mounted in the frame, and means for yieldingly maintaining the frame against movement.

2. A coupling including mating members each having a fluid conduit, a vertically adjustable frame for supporting each member and including a pivoted member for supporting the fluid conduit, and means for holding the mating members yieldingly engaged with each other.

3. An automatic pipe coupling for railway cars comprising mating heads, pivoted members carrying said heads, elastic means for normally maintaining the heads in coupling positions, and means supporting said members for vertical adjustment.

4. An automatic pipe coupling for railway cars comprising yieldable heads, means supporting said heads for vertical adjustment, and mating coupling heads mounted for universal movement on the first heads.

5. An automatic pipe coupling for railway cars comprising mating heads, each head including a support, a frame adjustable vertically on the support, and a yieldable member carried by the frame and connected with the coupling head.

6. A coupling head, a yieldable support therefor, a head having a fluid conduit therein, the said head having a substantially conical passage at one end of the conduit, an extensile spring fitting in the conical passage and conforming substantially in configuration therewith, and a gasket carried by the spring.

In testimony whereof I affix my signature in presence of two witnesses.

CLARENCE E. BURCHFIELD.

Witnesses:
    ISAAC HARR,
    E. V. TURNER.

---

Copies of this patent may be obtained for five cents each, by addressing the "Commissioner of Patents, Washington, D. C."